United States Patent [19]
Pamer

[11] 3,819,219
[45] June 25, 1974

[54] COLLISION ENERGY ABSORBER

[75] Inventor: Karl A. Pamer, Chagrin Falls, Ohio

[73] Assignee: McNeil Corporation, Akron, Ohio

[22] Filed: Nov. 22, 1972

[21] Appl. No.: 308,808

[52] U.S. Cl.............. 293/88, 293/70, 188/298, 267/116
[51] Int. Cl............. B60r 19/08, F16f 9/10
[58] Field of Search ........... 293/DIG. 2, 70, 85, 86, 293/88; 213/43; 267/35, 116, 121, 122, 123, 267/139, 140; 188/284; 298; 312; 316

[56] References Cited
UNITED STATES PATENTS

| | | | |
|---|---|---|---|
| 1,729,565 | 9/1929 | Caretta | 267/35 |
| 1,821,988 | 9/1931 | Rowles | 188/298 |
| 2,936,860 | 5/1960 | Péras | 188/298 |
| 3,008,746 | 11/1961 | Senger | 293/70 |
| 3,217,898 | 11/1965 | Stretch | 213/43 |
| 3,494,607 | 2/1970 | Rusch | 267/116 |

Primary Examiner—M. Henson Wood, Jr.
Assistant Examiner—Robert Saifer
Attorney, Agent, or Firm—Watts, Hoffmann, Fisher & Heinke

[57] ABSTRACT

A collision bumper connected to one of two relatively movable rigid parts of a pair of energy absorbing devices, the other parts of which are connected to the frame of a vehicle. The parts of the respective energy absorbing devices connected to the vehicle frame comprises rigid plate-like members provided with apertures through which rod-like portions of the parts connected to the bumper projects with a close but free sliding fit. Rigid tubular-like members extend from the bumper sides of the plate-like members and surround flexible tube-like members having their one ends sealed about the apertures in the platelike members and their other ends sealed to the rod-like portions. The ends of the rigid parts of the devices opposite to the ends connected to the bumper are fixed to the bottom of cup-like relatively heavy tube like elastic members enclosed in cup-like rigid members and having their open ends sealed about the apertures to the plate-like members. The open ends of the rigid cup-like members normally abut against the plate-like members and the relative depths of the elastic and cup-like members are such that the elastic members are under tension. The tube-like and elastic members are filled with liquid and the rod-like portions have axially extending grooves of decreasing cross section to meter the flow of fluid from the bumper side of the plate-like members to the other.

11 Claims, 4 Drawing Figures

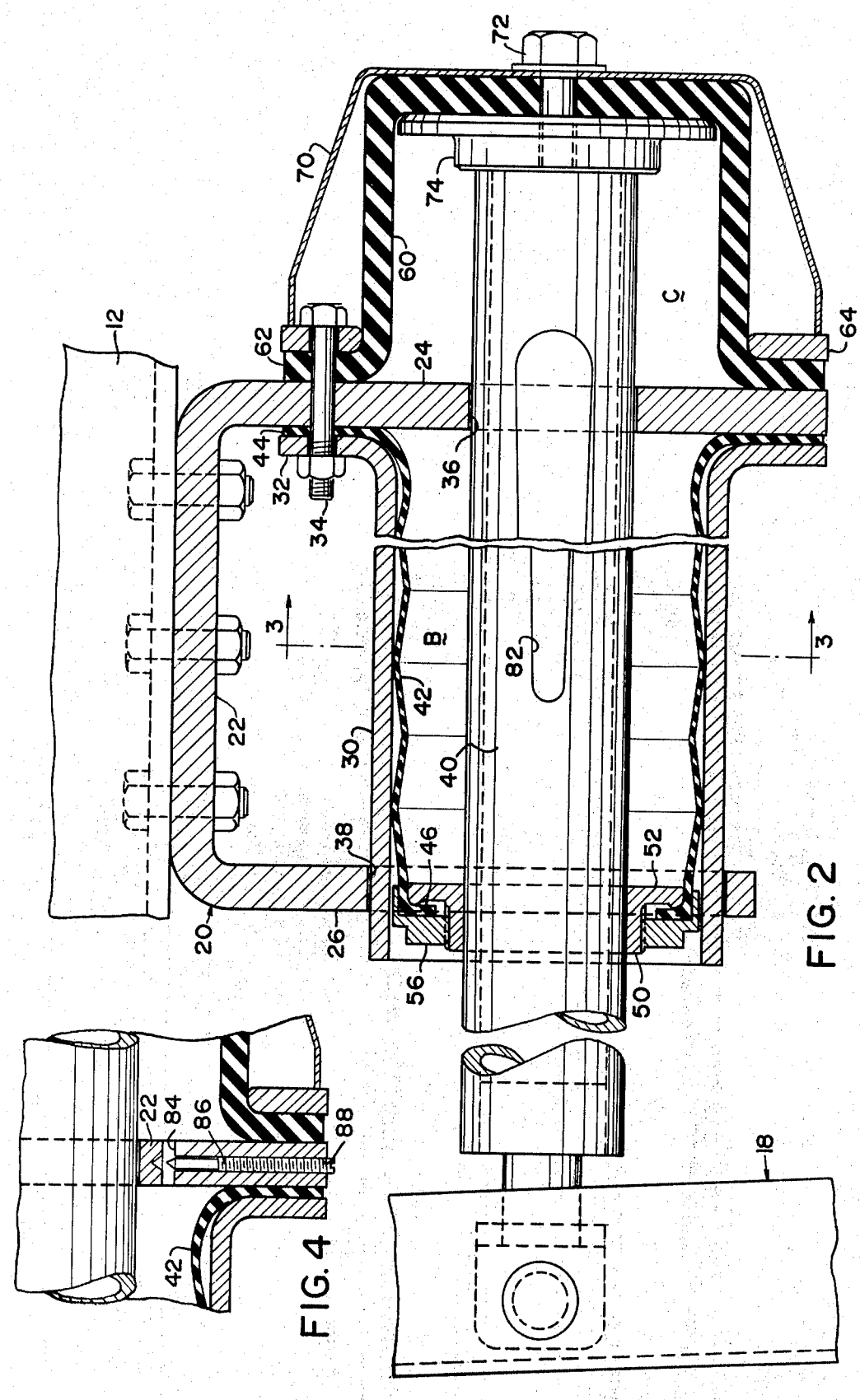

COLLISION ENERGY ABSORBER

BACKGROUND OF THE INVENTION

1. Field of the Invention

The invention relates to collision energy absorbing devices for movable objects, such as, on and/or off highway motor vehicles including recreational vehicles, movable material handling devices, for example, cranes, forklift trucks, etc.

2. Prior Art

Energy absorbing devices of innumerable different designs are available but such devices are inadequate, expensive, unreliable in service, and/or require frequent maintenance, etc.

SUMMARY OF THE INVENTION

The present invention provides a novel and improved energy absorbing device, especially suited for connecting a vehicle collision bumper to the frame of the vehicle, which is simple in construction, inexpensive to manufacture, reliable in operation, and requires no maintenance.

The invention further provides an energy absorber including a plurality of relatively movable assemblies having a predetermined relative normal operating position, one including a part orientated transversely of the direction of relative movement between the assemblies and having an aperture therethrough, a flexible tubular member at one side of said transversely orientated part enclosed in one of said assemblies and having one end sealed about the aperture therethrough and its opposite end closed, an elastic tubular member at the opposite side of said transversely orientated part having one end sealed about the aperture therethrough and its opposite end closed, liquid under pressure within the tubular members, and a rod-like member connected to the closed end of at least one of the tubular members and extending through the aperture in the transversely orientated part adapted to limit the flow of liquid therethrough from one of the tubular members to the other, the elastic tubular member continuously urging the assemblies to their predetermined operating position.

BRIEF DESCRIPTION OF THE DRAWINGS

FIG. 2 is a longitudinal, horizontal center sectional view, with parts in elevation, of the near energy absorbing device shown in FIG. 1;

FIG. 4 is a fragmentary view showing an alternative construction.

DESCRIPTION OF THE PREFERRED EMBODIMENT

Figure 1:
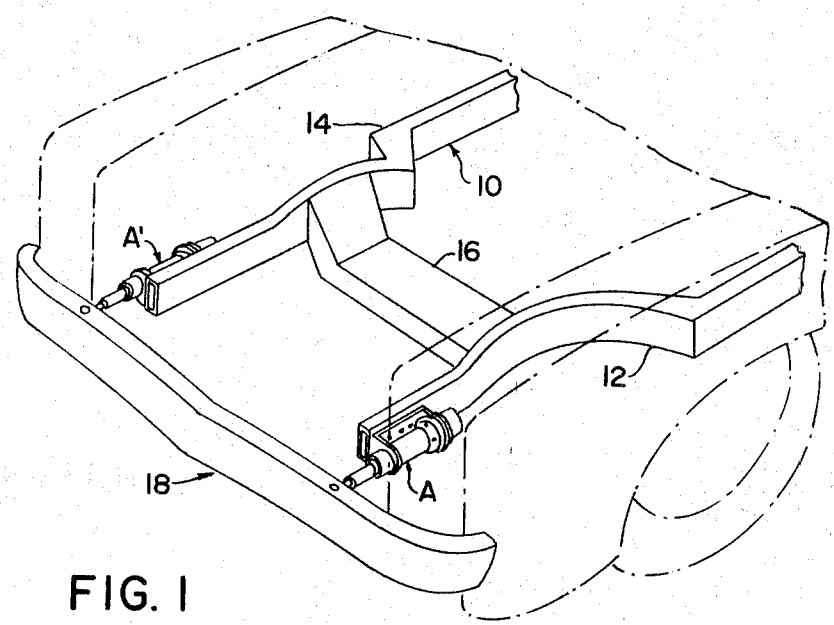
FIG. 1 is a fragmentary perspective view of the front end of a passenger automobile frame having a collision bumper connected thereto by a pair of energy absorbing devices embodying the present invention.
Figure 3:
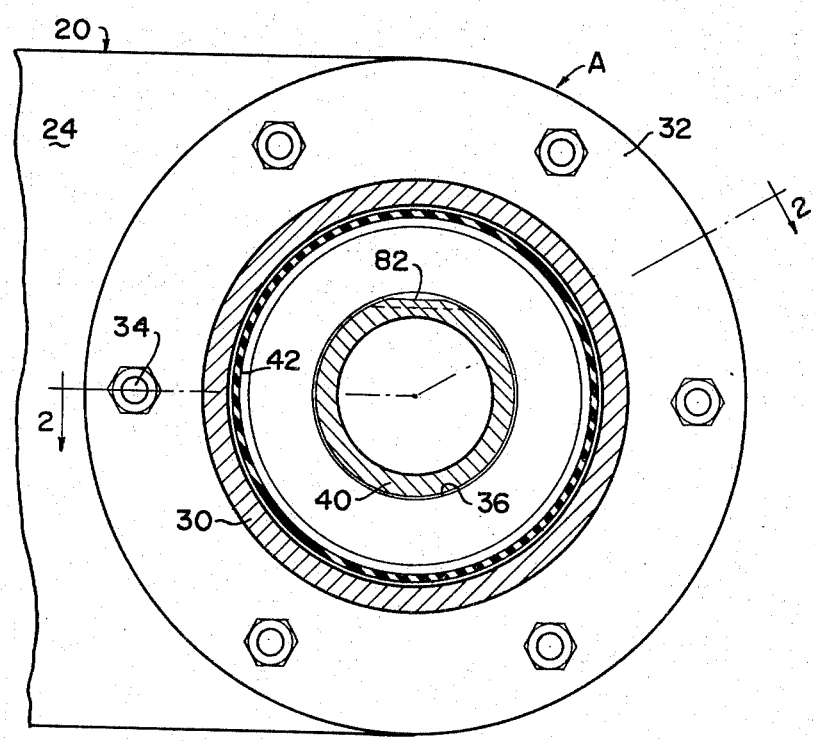
FIG. 3 is a sectional view approximately on the line 3—3 of FIG. 2.

Referring to the drawings, the reference character 10 designates generally an automobile chassis frame comprising a pair of rigid side frame rails 12, 14, interconnected adjacent to their forward end by a rigid cross member 16. A collision bumper structure 18 is connected to the frame rails 12, 14 by energy absorbing devices A, A' connected to the rails 12, 14, respectively, and to the bumper 18 adjacent to its opposite ends.

Except for the reversal of orientation, the energy absorbing devices A, A' are structurally identical and merely the device A is shown in detail in the drawings and is herein described. The corresponding parts of the device A', where they appear in the drawings or are herein referred to, are designated by the same reference characters as those employed in the description of the device A but with a prime mark attached thereto.

The energy absorber A comprises a channel-shaped metal member 20 comprising a web section 22 connecting two disk-like flange sections 24, 26. The web section 22 is bolted to the adjacent side frame rail 12 of the automobile chassis frame 10 to connect the energy absorber A to the automobile or vehicle. A rigid metal cylindrical, tubular member 30 having an external flange 32 at one end is connected as by bolts 34 to the disk section 24 of the member 20 concentric with an aperture 36 therethrough and at the side facing in the direction of the front of the vehicle. The end of the member 30 opposite the flange 32 extends through and is supported in an aperture 38 in the disk section 26 of the member 20. The bumper 18 is connected to one end of a rigid metal cylindrical, rod-like member 40 which extends through the tubular member 30 and through the aperture 36 in the disk section 24 of the member 20 with a predetermined close, but free sliding fit.

A relatively light, flexible, tubular, bellows-like member 42 having an outwardly projecting flange 44 at one end or having its one end capable of being formed into a flange 44, is located within the metal tubular member 30 with its flanged end 44 sealed about the aperture 36 in the disk section 24 of the member 20 by being clamped between the disk section 24 of the member 20 and the flange 32 of the tubular member 30 by the bolts 34. The opposite end of the member 42, which normally extends to about the free end of the tubular member 30, is flanged inwardly as at 46 and sealed to the member 40, or more specifically to a ring-like member 50 fixed to the member 40 and having a radial flange 52, by being clamped between the flange 52 and a cup-like member 56 threaded onto the member 50.

An elastic relatively heavy cup-shaped member 60, having a flange 62 at its rim, is located at the side of the disk section 24 of the member 20 opposite the side at which the tubular-like flexible member 42 is located. The member 60 is sealed around the aperture 36 in the disk section 24 of the member 20 by having the flange 62 thereof clamped between a clamp ring 64 and the right-hand side of the disk section 24 by the bolts 34, previously referred to. The member 60 is enclosed in a cup-shaped metal member 70 which is connected along with the member 60 to the end of the member 40 projecting through the aperture 36 by a cap screw 72 threaded into a suitably tapped aperture in the end of the member 40.

The end of the member 40 adjacent to the members 60 and which is of less diameter than the diameter of the bottom of the cup-shaped member 60, is provided with a flanged member 74 threaded or otherwise suitably secured to the member 40. The flange of the member 40 is of a diameter approximately equal to that of the bottom of the cup-shaped member 60. The rim of the member 70 normally abuts against the clamp ring 64 and the depth of the member 70 with respect to the normal depth of the member 60 is such that when the members are in the position shown in FIG. 2 the elastic member 60 is under a slight tension. This is readily accomplished during assembly of the parts by drawing the adjacent end of the member 40 and in turn the member 74 and the bottom of the cup-shaped member 60 toward the bottom of the cup-shaped member 70 by the threading of the screw 72 into the tapped aperture in the member 40.

The construction thus far described provides a closed vessel divided into two chambers, designated B and C, located at opposite sides of the disk section 24 of the member 20. These chambers are filled with a fluid, for example, through the openings in the members 60, 70 for the screw 72 before the screw is inserted therein. The oil can flow back and forth between the chambers B, C through an aperture or groove 82 in the side of the member 40, which is formed by a flat along one side of the rod member 40. The flat or groove 82 is of varying width and depth and in turn of cross-section area, decreasing in area toward the end of the energy absorbing device to which the bumper assembly 18 is connected.

The construction of the device A is such that as the member 40 is forced to the right, as viewed in FIG. 2, incident to a collision involving the bumper structure 18, the member 50 and the end of the flexible member 42 connected thereto move toward the right and the cylindrical side part of the cup-shaped elastic member 60 is stretched and elongated and oil flows through the aperture 82 from chamber B to chamber C. The resistance to the flow of oil from chamber B to chamber C increases as a function of the movement of the member 40 through the disk section 24 of the member 20 because of the decreasing cross-section area of the aperture 82.

When the member 40 has moved to the right, as viewed in FIG. 2, a distance sufficient to move the left-hand end of the slot 82 into the aperture 36 in the disk section 24 of the member 20, the member 40 has reached its designed limit of movement in the direction referred to. After removal of an obstruction, which has caused retraction of the member 40, the member 40 and in turn the bumper structure 18 will be returned to its original position relative to the member 20 and the frame 10 by the memory or elasticity of the cup-shaped member 60.

An alternative arrangement to that employed in the preferred embodiment for filling the chambers B, C, with oil and metering the flow of oil from one chamber to the other is illustrated in FIG. 4. As illustrated in this Figure, the aperture 82 of the preferred embodiment is eliminated and replaced by a conduit 84 extending through the partition-like disk section 24 of the member 20. The size of the opening through the conduit 84 is controlled by an adjustable needle valve 86 threaded into a suitably tapped aperture 88 in the disk section 24 and orientated normal to the length of the conduit or aperture 84. The needle valve 86 is accessible from the exterior of the disk section 24 of the member 20.

By removing the needle valve 84 from the threaded aperture 88 in which it is normally located, the chambers B and C can be filled with oil through the aperture 88.

While the preferred embodiment of the invention has been described in considerable detail and as connecting a bumper structure of an automobile to an automobile chassis frame, it is to be understood that the invention may be embodied in constructions other than in the particular construction shown and that it can be employed in numerous applications where it is desired to absorb energy. Other alternative constructions in addition to those already mentioned would be to replace the cup-shaped elastic member 60 by a tubular elastic member having one end sealed to the partition between the chambers B, C, that is, the member or section 24 of the member 20 and its other end sealed to the end of the rod member 40 to the right of the partition member 24, omission of the combination housing and stop member 70, use of a stop member located within the chamber C, etc.

It is also to be understood that while particular valving constructions are shown for controlling the flow of fluid between the chambers B and C, any suitable means can be employed and such means may or may not vary the resistance to the flow of fluid between the chambers as a function of the relative movement of the telescoping parts of the device, as desired.

From the foregoing disclosure, it will be apparent that the objects heretofore enumerated and others have been accomplished and that there has been provided an energy absorbing device which is simple in construction, inexpensive to manufacture, reliable in operation, has a completely sealed fluid chamber and requires no maintenance.

Having thus described my invention, what I claim is:

1. A rigid tubular member; a rigid second member adjacent to one end of said tubular member, fixed with respect thereto and having an aperture therethrough aligned with the opening in said tubular member; a rod-like member movable through said aperture in said second member with a predetermined clearance; a flexible tubular member within said rigid tubular member having one end sealed about said aperture through said second member; a fifth member slidable relative to said rigid tubular member, fixed to said rod-like member and having the other end of said flexible tubular member sealed thereto; an elastic tube-like member having its one end sealed with respect to said second member and its other end sealed with respect to said rod-like member and continuously urging said tubular member and said rod-like member to a predetermined relative operating position; and means for controlling the flow of fluid from one side of said second member to the other.

2. A rigid tubular member; a rigid second member adjacent to one end of said tubular member, fixed with respect thereto and having an aperture therethrough aligned with the opening through said tubular member; a rigid rod-like member movable through said aperture in said second member with a predetermined close clearance; opposite ends of said rod-like member extending outwardly of said tubular member and said second member; a flexible tubular member within said rigid tubular member having one end sealed about said aperture through said second member; a fifth member slidably supported within said rigid tubular member, fixed to said rod-like member and having the other end of said flexible tubular member sealed thereto; an elastic tube-like member having its one end sealed with respect to said second member and its other end sealed to said rod-like member and continuously urging said tubular member and said rod-like member to a predetermined relative operating position; valve means for controlling the flow of fluid from one side of said second member to the other; and means responsive to the relative movement of said rod-like member with respect to said second member for controlling said valve means to vary its resistance to the flow of fluid from one side of said second member to the other.

3. A rigid tubular member; a rigid second member adjacent to one end of said tubular member, fixed with respect thereto and having an aperture therethrough aligned with the opening in said tubular member; a rigid rod-like member in said tubular member and extending through said aperture in said second member with a predetermined clearance; opposite ends of said rod-like member extending outwardly of said tubular member and said second member; a flexible tubular member within said rigid tubular member having one end sealed about said aperture through said second member; a fifth member slidably supported within said rigid tubular member, fixed to said rod-like member and having the other end of said flexible tubular member sealed thereto; an elastic cup-like member having its rim sealed with respect to said second member and enclosing the end of said rod-like member and continuously urging said tubular member and said rod-like member to a predetermined relative operating position; and means for controlling the flow of fluid from one side of said second member to the other.

4. A rigid tubular member; a rigid second member adjacent to one end of said tubular member, fixed with respect thereto and having an aperture therethrough aligned with the opening through said tubular member; a rigid rod-like member in said tubular member and extending through said aperture in said second member with a predetermined clearance; opposite ends of said rod-like member extending outwardly of said tubular member and said second member; a flexible tubular member within said rigid tubular member having one end sealed about said aperture through said second member; a fifth member slidably supported within said rigid tubular member, fixed to said rod-like member and having the other end of said flexible tubular member sealed thereto; an elastic cup-like member having its rim sealed with respect to said second member and enclosing the end of said rod-like member projecting through said second member; a rigid cup-like member externally of said elastic cup-like member and having its rim normally engaging an abutment surface fixed with respect to said second member; means connecting said rigid cup-like member and elastic cup-like member to the adjacent end of said rod-like member; and valve means for controlling the flow of fluid from one said of said second member to the other.

5. A rigid tubular member; a rigid second member adjacent to one end of said tubular member, fixed with respect thereto and having an aperture therethrough aligned with the opening through said tubular member; a rigid rod-like member in said tubular member and extending through said aperture in said second member with a predetermined close clearance; opposite ends of said rod-like member extending outwardly of said tubular member and said second member; a flexible tubular member within said rigid tubular member having one end sealed about said aperture through said second member; a fifth member slidably supported within said rigid tubular member, fixed to said rod-like member and having the other end of said flexible tubular member sealed thereto; an elastic cup-like member having its rim sealed with respect to said second member and enclosing the end of said rod-like member projecting through said second member; a rigid cup-like member externally of said elastic cup-like member and having its rim normally engaging an abutment surface fixed with respect to said second member; means connecting said rigid cup-like member and elastic cup-like member to the adjacent end of said rod-like member; valve means for controlling the flow of fluid from one side of said second member to the other; and means responsive to the relative movement of said rod-like member with respect to said second member for controlling said valve means to vary its resistance to the flow of fluid from one side of said second member to the other.

6. In a vehicle the combination comprising a collision bumper, an energy absorbing device operative to connect said bumper to said vehicle and absorb energy imparted to said bumper by impacts thereon permitting controlled movement of said bumper relative to said vehicle, said energy absorbing device comprising a rigid first member; a rigid second member adjacent to one end of said tubular member having an aperture therethrough aligned with the opening through said tubular member; means connecting said second member to said vehicle; a rigid rod-like member in said tubular member and extending through said aperture in said second member with a predetermined clearance; opposite ends of said rod-like member extending outwardly of said tubular member and said second member; means connecting said rod-like member to said bumper; a flexible tubular member within said rigid tubular member having one end sealed about said aperture through said second member; a fifth member slidably supported within said rigid tubular member, fixed to said rod-like member and having the adjacent end of said flexible tubular member sealed thereto; an elastic tube-like member having its one end sealed with respect to said second member and its other end sealed with respect to said rod-like member and continuously urging said tubular member and said rod-like member to a predetermined relative operating position; and valve means for controlling the flow of fluid from one side of said second member to the other.

7. In a vehicle the combination comprising a collision bumper, an energy absorbing device operative to connect said bumper to said vehicle and absorb energy imparted to said bumper by impacts thereon by permitting controlled movement of said bumper relative to said vehicle, said energy absorbing device comprising a rigid first member; a rigid second member adjacent to one end of said tubular member having an aperture therethrough aligned with the opening through said tubular member; means connecting said second member to said vehicle; a rigid rod-like member in said tubular member and extending through said aperture in said second member with a predetermined clearance; opposite ends of said rod-like member extending outwardly of said tubular member and said second member; means connecting said rod-like member to said bumper; a flexible tubular member within said rigid tubular member having one end sealed about said aperture through said second member; a fifth member slidably supported within said rigid tubular member, fixed to said rod-like member and having the adjacent end of said flexible tubular member sealed thereto; an elastic cup-like member having its rim sealed with respect to said second member and enclosing the end of said rod-like member projecting through said second member; a rigid cup-like member enclosing said elastic cup-like member and having its rim normally engaging an abutment surface fixed with respect to said second member; means connecting said rigid cup-like member to the adjacent end of said rod-like member with said elastic member under tension; and valve means for controlling the flow of fluid from one side of said second member to the other.

8. In an energy absorber a plurality of relatively movable assemblies having a predetermined relative normal operating position, one of said assemblies including a part orientated transversely of the direction of relative movement between the assemblies and having an aperture therethrough, a flexible tubular member at one side of said transversely orientated part enclosed in one of said assemblies and having one end sealed about said aperture therethrough and its opposite end closed, an elastic tubular member at the opposite side of said transversely orientated part having one end sealed about said aperture therethrough and its opposite end closed, said tubular members being adapted to contain liquid under pressure, and a rod-like member connected to the closed end of at least one of said tubular members and extending through said aperture in said transversely orientated part adapted to limit the flow of liquid therethrough from one of said tubular members to the other, said elastic tubular member continuously urging said assemblies to said predetermined position.

9. In an energy absorber first and second relatively movable assemblies having a predetermined relative normal operating position, one of said assemblies including a part orientated transversely of the direction of relative movement between the assemblies and having an aperture therethrough, a flexible tubular member at one side of said transversely orientated part enclosed in one of said assemblies and having one end sealed about said aperture therethrough and its opposite end closed, an elastic tubular member at the opposite side of said transversely orientated part having one end sealed about said aperture therethrough and its opposite end closed, said tubular members being adapted to contain liquid under pressure, and a rod-like member connected to the closed ends of both of said tubular members and extending through said aperture in said transversely orientated part for limiting the flow of liquid therethrough from one of said elastic tubular members to the other, said elastic tubular member continuously urging said assemblies to said predetermined position.

10. In an energy absorber, first and second relatively slidable assemblies having a predetermined relative normal operating position, at least one of said assemblies being tubular and having a rigid partition member fixed thereto and closing the same except for an aperture through the partition member, a flexible tubular member at one side of said partition member enclosed in one of said assemblies and having one end sealed about said aperture through said partition member and its other end closed, an elastic tubular member at the opposite side of said partition member having one end sealed about said aperture through said partition member and its opposite end closed and connected to the other of said assemblies, said tubular members being adapted to contain liquid under pressure, and a rod-like member connected to said closed end of said elastic tubular member and extending through said aperture in said partition member for limiting the flow of liquid therethrough from one of said tubular members to the other, said elastic tubular member continuously urging said assemblies to said predetermined position.

11. In an energy absorber, first and second relatively slidable assemblies having a predetermined relative normal operating position, at least one of said assemblies being tubular and having a rigid partition member fixed to said tubular assembly and closing the same except for an aperture through the partition member, a flexible tubular member at one side of said partition member enclosed in one of said assemblies and having one end sealed about said aperture through said partition member and its other end closed, an elastic tubular member at the opposite side of said partition member having one end sealed about said aperture through said partition member and its opposite end closed and connected to the other of said assemblies, said tubular members being adapted to contain liquid under pressure, and a rod-like member connected to said closed ends of both of said tubular members and extending through said aperture in said partition member for limiting the flow of liquid therethrough from one of said elastic tubular members to the other, said elastic tubular member continuously urging said assemblies to said predetermined position.

* * * * *

PO-1050
(5/69)

UNITED STATES PATENT OFFICE
CERTIFICATE OF CORRECTION

Patent No. 3,819,219    Dated June 25, 1974

Inventor(s) KARL A. PAMER

It is certified that error appears in the above-identified patent and that said Letters Patent are hereby corrected as shown below:

| | | |
|---|---|---|
| Column 4 | line 36 | delete [within said rigid tubular member] |
| Column 4 | line 46 | delete [means for] |
| Column 7 | line 12 | after "position" insert --and at least one of which is tubular,-- |
| Column 7 | line 15 | after "member" insert --in said tubular assembly and-- |
| Column 7 | line 16 | after "part" delete [enclosed in one of said assemblies and] |
| Column 7 | line 33 | after "position" insert --and at least one of which is tubular-- |
| Column 7 | line 37 | after "member" insert --in said tubular assembly and-- |
| Column 7 | line 38 | after "part" delete [enclosed in one said assemblies an |
| Column 6 | line 21 | delete [first] and insert --tubular--. |

ABSTRACT
Column 2  line 5    "comprises" should be --comprise--.

Signed and sealed this 19th day of November 1974.

(SEAL)
Attest:

McCOY M. GIBSON JR.
Attesting Officer

C. MARSHALL DANN
Commissioner of Patents